United States Patent
Lee

(10) Patent No.: US 7,266,517 B2
(45) Date of Patent: Sep. 4, 2007

(54) METHOD TO CREATE AN INVENTORY FILE WITH THE APPLICATION OF WAREHOUSE MANAGEMENT SYSTEM

(75) Inventor: Yeun-Jonq Lee, Hsin Tien (TW)

(73) Assignee: Via Technologies, Inc., Hsin Tien City, Taipei Hsien (TW)

( * ) Notice: Subject to any disclaimer, the term of this patent is extended or adjusted under 35 U.S.C. 154(b) by 621 days.

(21) Appl. No.: 10/229,025

(22) Filed: Aug. 28, 2002

(65) Prior Publication Data

US 2003/0050872 A1 Mar. 13, 2003

(30) Foreign Application Priority Data

Sep. 7, 2001 (TW) .............................. 90122286 A

(51) Int. Cl.
*G06Q 10/00* (2006.01)

(52) U.S. Cl. ......................................... 705/28; 705/22

(58) Field of Classification Search .................. 705/28, 705/22

See application file for complete search history.

(56) References Cited

U.S. PATENT DOCUMENTS

| 6,341,269 B1 * | 1/2002 | Dulaney et al. | ............... 705/22 |
| 6,622,127 B1 * | 9/2003 | Klots et al. | ................... 705/28 |
| 6,754,636 B1 * | 6/2004 | Walker et al. | ................ 705/26 |

* cited by examiner

*Primary Examiner*—Ronald Laneau
(74) *Attorney, Agent, or Firm*—Birch, Stewart, Kolasch & Birch, LLP

(57) ABSTRACT

A method for a warehouse management system (WMS) to record an object inventory file in a computer-readable database. The data structure of the object inventory file comprises warehouse category, item number, location, unit and quantity, wherein the warehouse category, to directly reflect the physical location of the object, is based on the warehouse where the object is actually stored rather than the object management attribute.

3 Claims, 6 Drawing Sheets

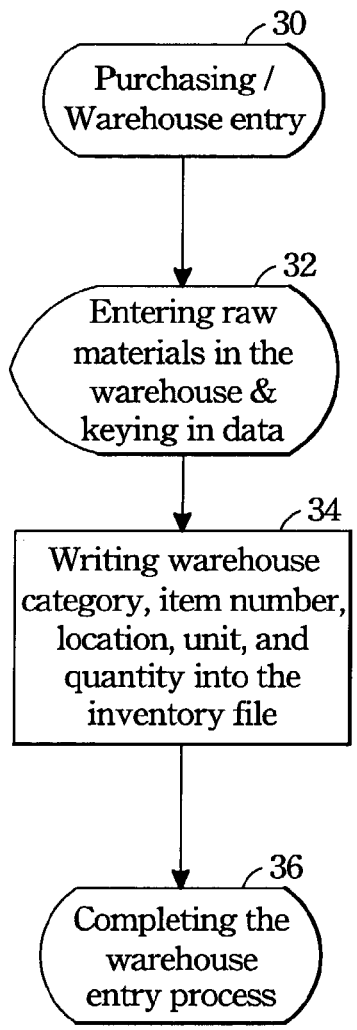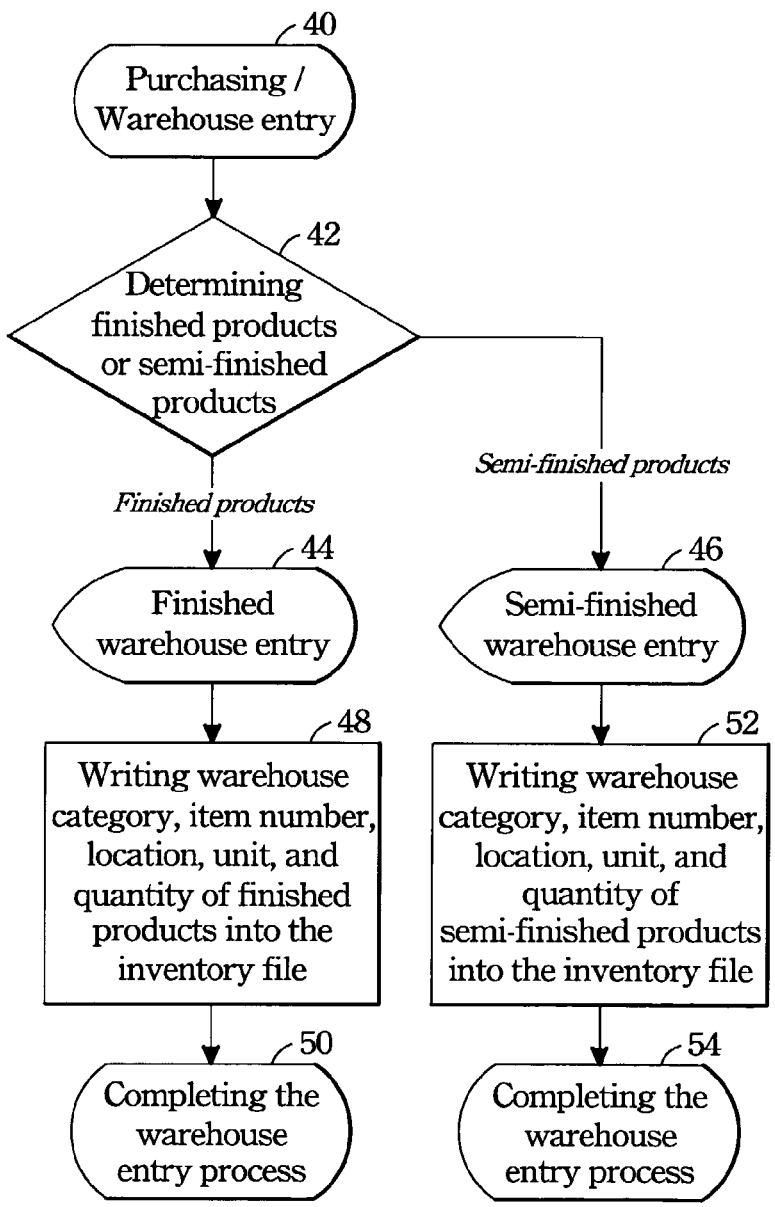
Fig. 2A
(Prior Art)
Fig. 2B
(Prior Art)

METHOD TO CREATE AN INVENTORY FILE WITH THE APPLICATION OF WAREHOUSE MANAGEMENT SYSTEM

FIELD OF THE INVENTION

The present invention relates to a warehouse management method, and more specifically, a method and system with improved inventory file structure to enhance warehouse management efficiency.

BACKGROUND OF THE INVENTION

For a business, inventory operation not only provides the function to regulate production, purchase, and sale, but is also a part of its assets. Therefore, inventory management has a major impact on the operation and profitability of a business. Especially for a company with a gradually enlarging business scale, its entered and withdrawn quantities of raw materials and objects in the warehouse also hugely increase. Consequently, the capability to improve the efficiency of material circulation and inventory plays a crucial role in the company's performance. In recent years, the rapid progress of hardware and software industries has promoted the warehouse management system (WMS) development, which has thus improved business efficiency in warehouse management. Generally speaking, the essential requirement for inventory management is to create the data file for stored objects; all of the information—such as warehouse category for stored objects, storage location in the warehouse, item number, unit, and quantity—needs to be entered in the inventory file for its utilization by related production, purchase, selling and financial systems.

The inventory file of a conventional WMS classifies objects with their attributes. The finished warehouse stores finished products; semi-finished warehouse stores semi-finished products; raw material warehouse stores raw materials and objects. Most WMSs further relate to the states of finished, semi-finished products and separate their storage location into second-grade product warehouse, newly finished warehouse, out-dated warehouse, rejected warehouse, and etc. However, a business limited to only one warehouse has to re-designate the warehouse into finished warehouse, semi-finished warehouse, and raw material warehouse for the WMS to correctly calculate and use the inventory information. As a result, the warehouse categorization for these systems to correctly calculate and use inventory information causes ineffectiveness in inventory management because of repeated transferring/allocating of objects between different warehouse categories during the production or sale processes.

FIG. 1 illustrates the related processes of object purchase, production, processing, and sale, which usually begin with purchasing 10, storing raw material in the raw material warehouse 12, creating the inventory file, and then withdrawing raw materials (based on the manufacture scale) for production/processing 14 to make semi-finished or finished products. On this point, the above-mentioned WMS designates the semi-finished and finished products to go separately into the semi-finished warehouse 16 and the finished warehouse 18 while entering the information in the inventory file. For some more thoroughly categorized WMSs, the products to go into the semi-finished warehouse are further categorized based on their states and entered into second-grade, approved, and defective warehouses; while the products for the finished warehouse are also categorized into the second-grade, approved, and defective objects. Rejected products from production error are moved into the rejected warehouse 20 for further processing.

Note that, based on the conventional WMS design, only objects stored in the finished warehouse 18 are ready for sale. Thus, when a company decides to sell the objects stored in the raw material warehouse 12 or semi-finished warehouse 16 for strategic or business reasons, the system must virtually transfer/allocate the objects into finished warehouse 18 before the selling process 22. Sometimes, for processing accurate counting during inventory management, the objects stored in raw material warehouse 12 or the objects in semi-finished warehouse 16 have to be physically moved into the finished warehouse 18 before the selling process.

FIG. 2A illustrates the storage processes of a conventional WMS, which start with the completion of purchasing and storing 30, followed by entering the information of stored raw materials 32 comprised of warehouse category, item number, location, unit, and quantity; the next step is writing the information into the inventory file 34 to complete the warehouse entry processes 36. Similarly, as FIG. 2B illustrates, while processing warehouse entry after production 40, the objects are separated with finished or semi-finished attributes 42 to be entered into finished warehouse 44 or entered into semi-finished warehouse 46. While processing warehouse storage for finished products, the information of (finished) warehouse category, item number, location, unit, and quantity is entered and written into the inventory file 48 to complete the operation 50; for semi-finished products, the related information is entered and written into the inventory file 52 to complete the warehouse entry processes 54.

FIG. 3A illustrates the warehouse withdrawal processes of a conventional WMS. Consecutive steps start with processing material withdrawal for production 60, withdrawing required objects from the raw material warehouse or semi-finished warehouse 62, pertaining to the raw material or semi-finished attributes of objects 64, deducting the withdrawn quantity from the object inventory in the raw material warehouse 66, deducting the withdrawn quantity from the object inventory in the semi-finished warehouse 68, and finishing the object withdrawal for production process 70. Similarly, FIG. 3B illustrates the consecutive processes from processing product withdrawal for sale 72, determining finished products 74, withdrawing finished objects from finished warehouse based on the order's requested quantity 76, deducting the withdrawn quantity from the finished warehouse inventory 78 and finishing the withdrawal for sale processes 80. Alternatively, the objects, not being selected as finished products 74, are transferred/allocated into raw material or semi-finished warehouse 82 by manually entering the related information 84.

With the limitation of physical inventory space, some companies are unable to create various warehouses and tend to segregate their only warehouse into several virtual warehouses. However, when there are too many types of objects stored in the same warehouse, it becomes very complicated and tedious to process counting, inventory management, and warehouse entry/withdrawal. Moreover, the stored object quantity in the warehouse is measured based on object attributes (such as finished products, semi-finished products, raw materials, rejects, and etc.), so only the book inventory quantity can be provided as reference for production, counting, and sale. As a result, the inventory quantity cannot correctly reflect the updated states of related operations such as ordered but undelivered objects, requests from clients for quotations, or what has been scheduled in the production plan.

SUMMARY OF THE INVENTION

The main purpose of the present invention is to provide an inventory management method that defines the warehouse based on the physical object location.

The second purpose of the present invention is to provide a method to create an object inventory file in the computer-readable database of a WMS, wherein the categorization of warehouses pertains to the physical object location rather than specifying the object with attributes such as raw material, finished product, or semi-finished product.

The third purpose of the present invention is to provide a warehouse management method which can vastly reduce the transferring/allocating operations among warehouse categories, and effectively simplify the processes from purchasing to selling.

The present invention discloses a method for a computer-readable database of a WMS to create an object inventory file; the data structure in the object inventory file comprises warehouse category, item number, location, unit, and quantity, wherein the warehouse category is based on where the object is actually stored to directly reflect its physical location. Creating an object inventory file with the method occupies less space in the database and effectively improves object purchase, production, and sales processes in the WMS operation.

The above-mentioned processes start with purchasing/storing the object in the warehouse, and followed with operating the WMS system to create the first inventory file comprised of warehouse category, item number, location, unit, and quantity in the computer-readable database, wherein the warehouse category is based on where the first object is stored to actually reflect its physical location. Next, the first inventory file is read before the first object is withdrawn from the warehouse based on the production requirement plan; the WMS is operated to modify and update the first inventory file in the database, wherein the inventory quantity is recalculated based on the withdrawn state of the first object. After the first object is processed and transformed into the second object, the second object is stored in the warehouse. The next step is the WMS operation to create the second inventory file which comprises the second object's warehouse category, item number, location, unit, and quantity, in the database; wherein the warehouse category is based on the warehouse where the second object is stored to actually reflect its physical location. The first and second inventory files are read by the WMS and the quantities of ordered objects are withdrawn from the warehouse, wherein the objects can either be the first object, or the second object, or any other combinations. The final step is the WMS operation to modify and update the first and the second inventory files, wherein the first and the second inventory quantities are deducted based on the withdrawn amounts of the objects.

BRIEF DESCRIPTION OF THE DRAWINGS

The various advantages of the present invention and the above description can be easily understood by means of the following detailed description and drawings:

FIG. 2A illustrates the related processes for object purchase/warehouse entry in accordance with the prior art;

FIG. 2B illustrates the related processes for object production/warehouse entry in accordance with the prior art;

DETAILED DESCRIPTION OF THE INVENTION

Figure 1:
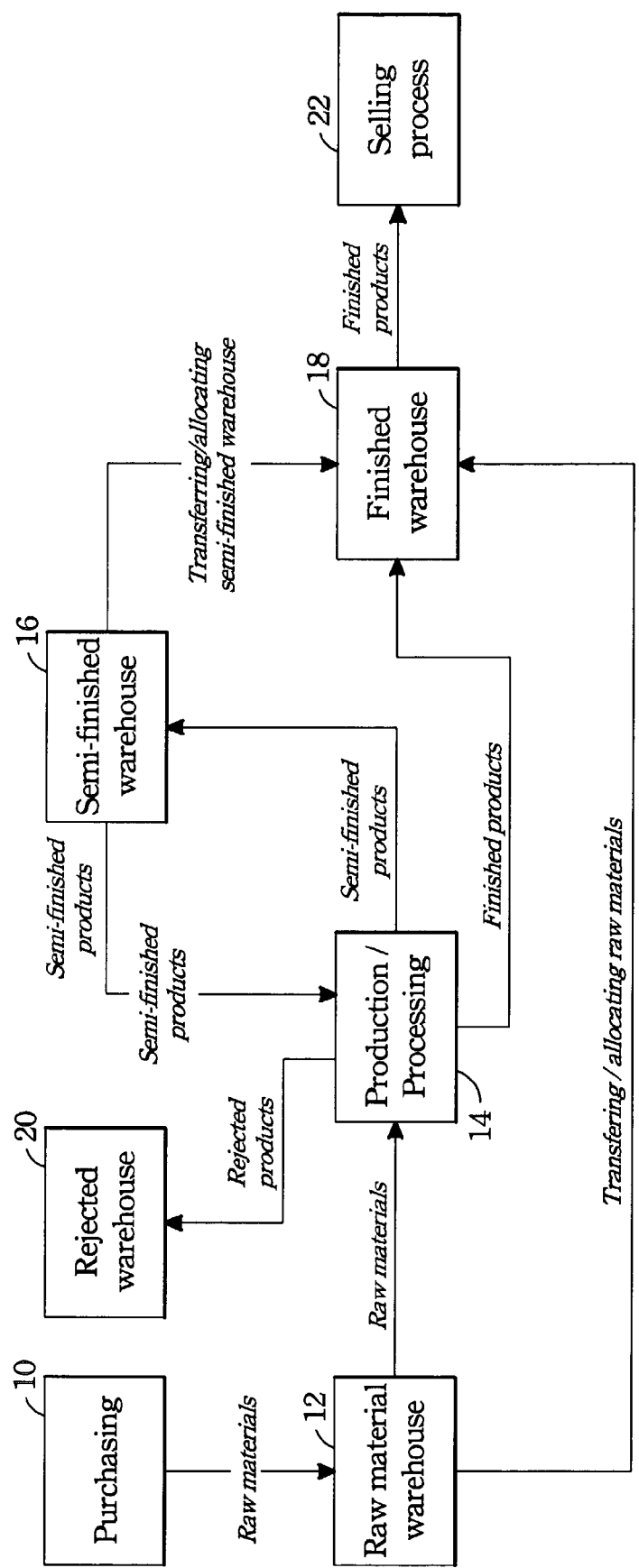
FIG. 1 illustrates the processes for processing object purchase, production, processing and selling in accordance with the prior art.
Figure 3A:
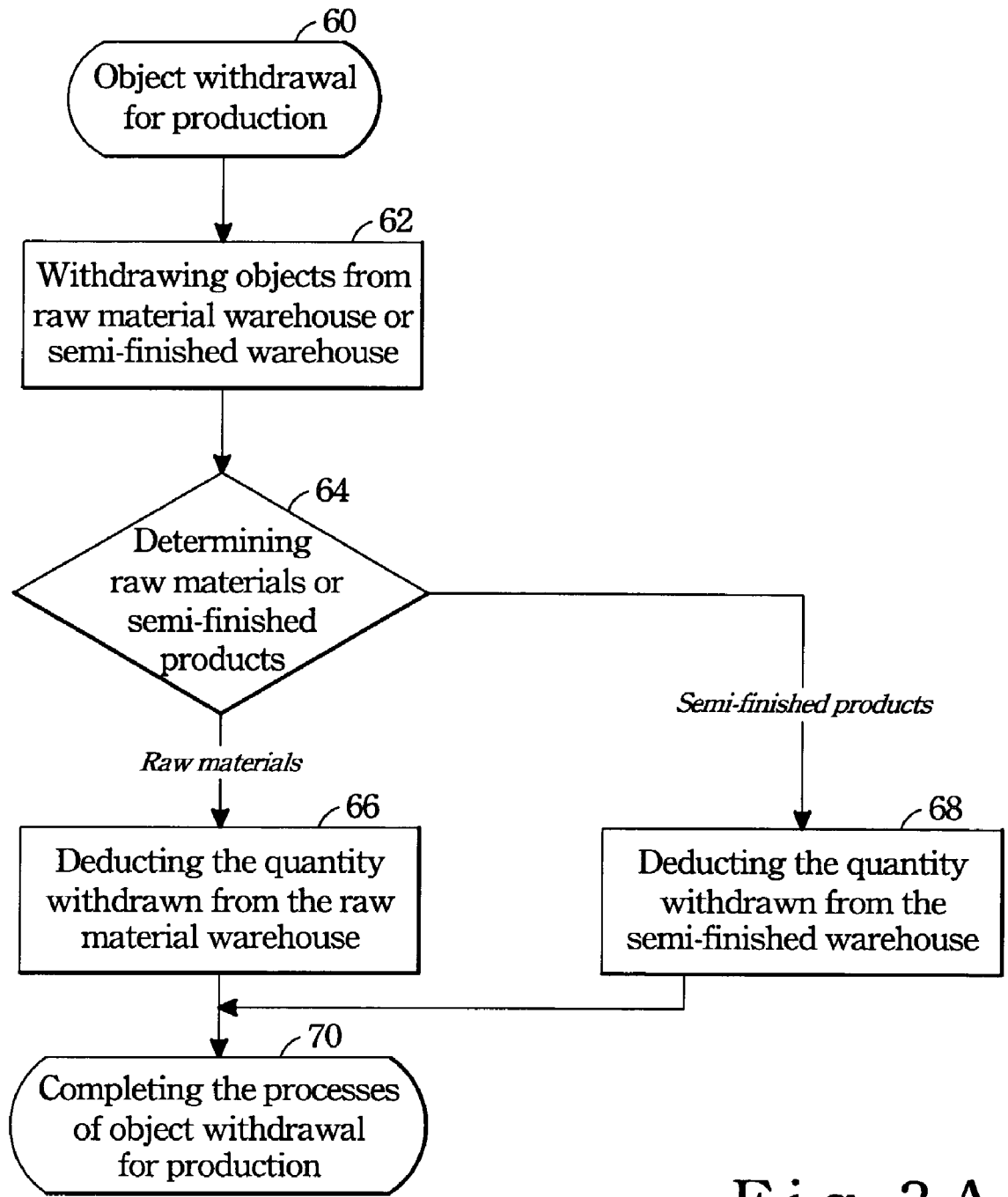
FIG. 3A illustrates the flow chart for processing object withdrawal for production in accordance with the prior art.
Figure 3B:
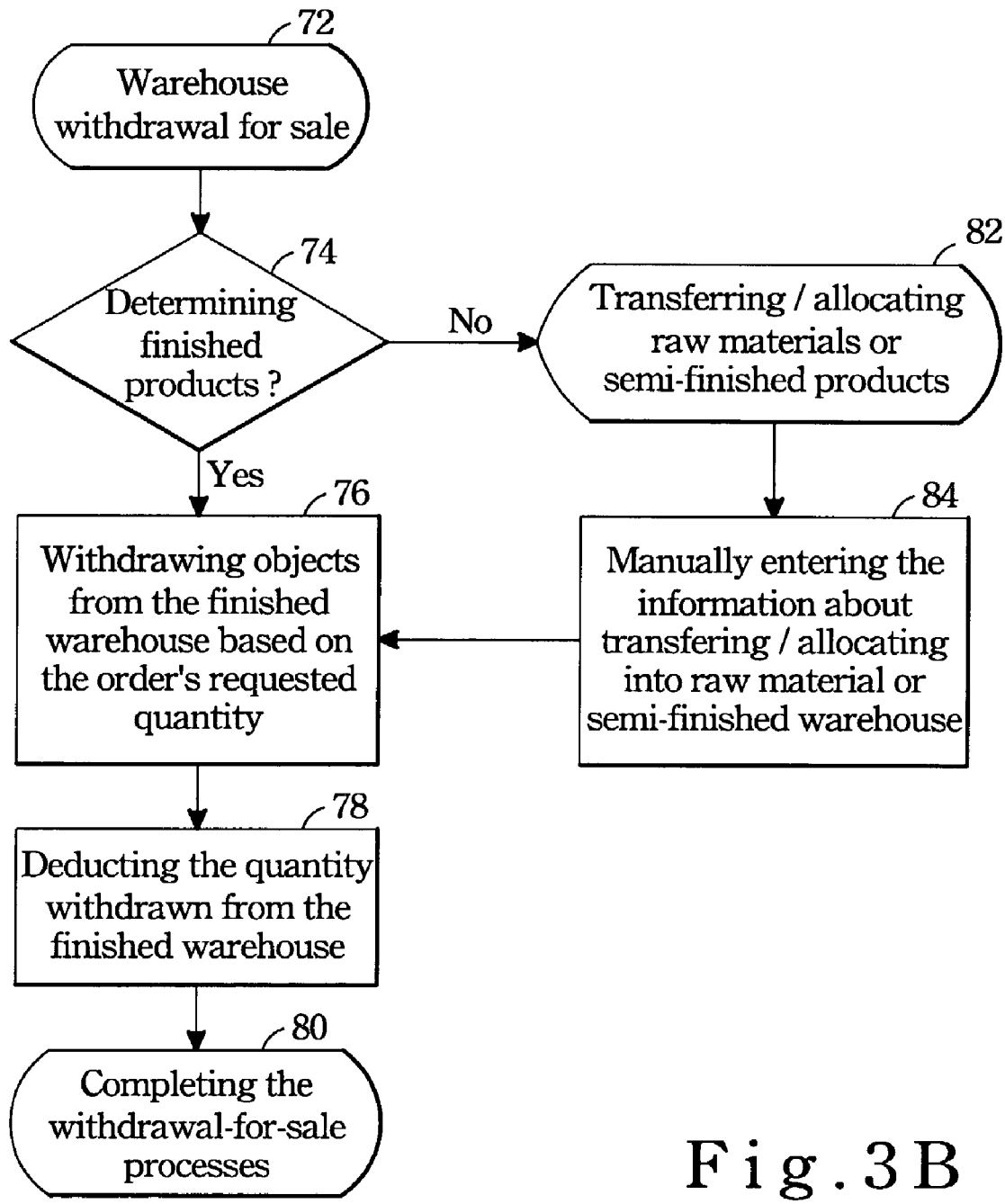
FIG. 3B illustrates the flow chart for processing object withdrawal for sale in accordance with the prior art.
Figure 4:
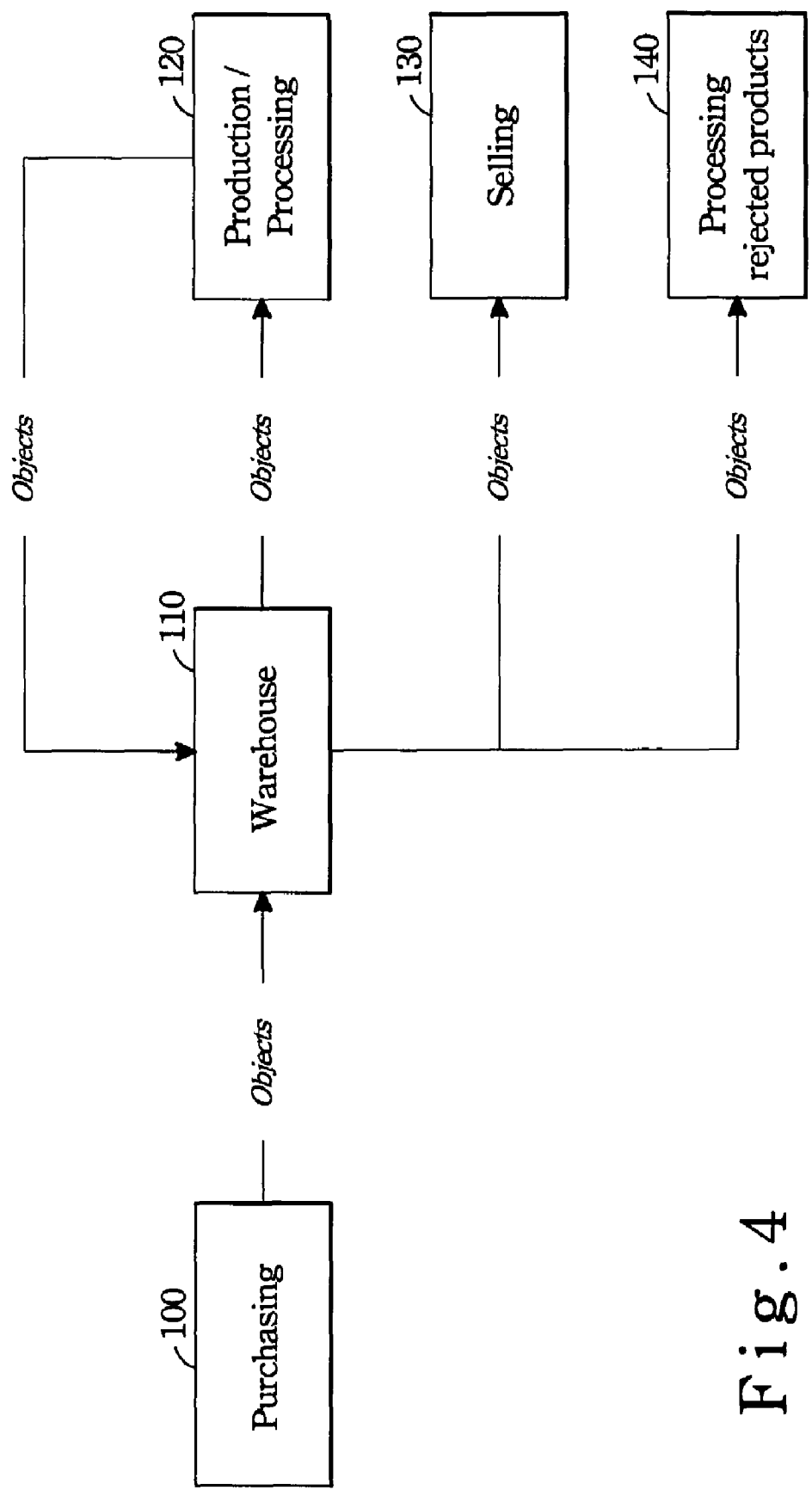
FIG. 4 illustrates the flow chart for processing object purchase, production, processing and selling in accordance with the present invention.

The present invention provides a method for the WMS to record object inventory files in a computer-readable database. The object inventory file comprises warehouse category, item number, location, unit, and quantity, wherein the warehouse category is defined with the actual inventory location of the object rather than object attribute (such as finished product, semi-finished product, raw material, and etc.,). Thus, when processing object purchase, production, processing and even selling, the inventory file can vastly reduce the transfer/allocation of warehouse category and improve the efficiency for object inventory. The detailed description of the present invention is as follows:

FIG. 4 illustrates the application of the present invention to create object inventory file in the processes of purchasing, production/processing, and even selling; wherein, after the purchasing process 100, the object is stored in the warehouse 110 and a related inventory file is created in the computer-readable database in the WMS; wherein the data structure of the object inventory file comprises warehouse category, item number, location, unit, and quantity. Note that the inventory file of the present invention pertains to the actual object location for warehouse categorization rather than object attribute; that is to say, the inventory file does not separate objects into finished products, semi-finished products and raw materials, nor categorize the warehouse into finished, semi-finished and raw material warehouses.

Figure 5A:
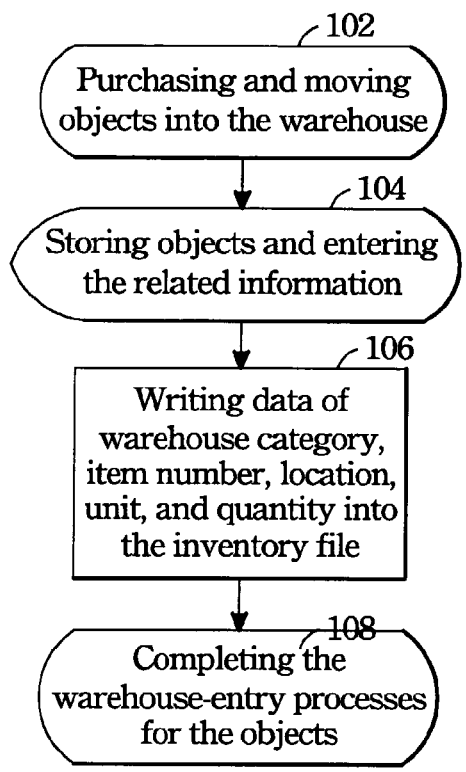
FIG. 5A illustrates the flow chart for processing object purchase/warehouse entry in accordance with the prior art.

The application of the present invention to create an inventory file for warehouse entry after purchase is illustrated in FIG. 5A. The sequence starts from completing the warehouse entry 102, keying in the entered object information (operating the WMS to create the object inventory file) 104. Next, the data is written into the inventory file 106 and recorded into the computer-readable database to complete the warehouse entry process 108, wherein the data structure in the inventory file comprises warehouse category, item number, storage location, unit, and quantity of the stored objects. Again, the object attribute (raw material) and the warehouse category (raw material warehouse) do not need to be mentioned when entering the original information about the object, because the warehouse category is based on where the object is actually stored to reflect its physical location.

Thus, when processing the production/processing procedure 120 (as in FIG. 4), the WMS is operated to read the above inventory file from the database, and based on the item number and inventory category in the data inventory file to determine the warehouse where the object is actually stored; based on the actual storage location, the raw material is withdrawn to continue the related operation of production/processing and the withdrawn quantity of the raw material is deducted from the inventory. Note that the warehouse is not categorized with the object attribute when creating the object inventory file, so the processed object can be directly stored in the warehouse 110 after finishing the production.

Figure 5B:
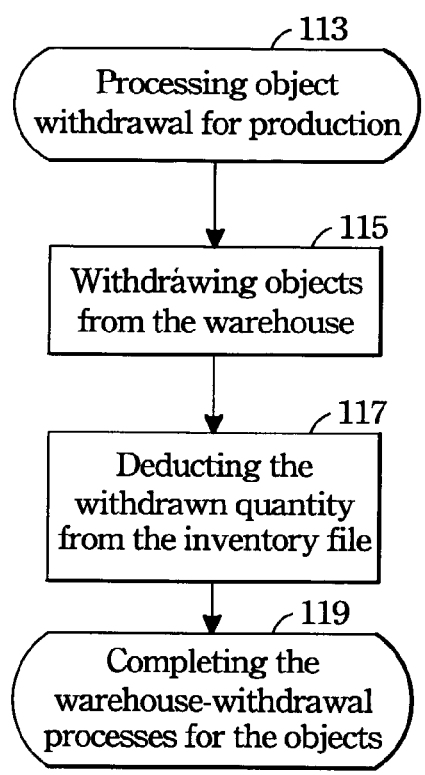
FIG. 5B illustrates the flow chart for processing object withdrawal for production in accordance with the prior art.

FIG. 5B illustrates the related object withdrawal processes. The warehouse category in the inventory file, as mentioned above, is not based on object attribute. During the warehouse withdrawal for production process 113, only the WMS is operated to read the related inventory file in the database for the actual storage location and the warehouse category of the object; wherein the required object quantity is withdrawn based on the production requirement plan 115, and is deducted directly from the inventory file 117. The inventory file, after being modified, is recorded in the database to finish the withdrawal process 119. Note that the withdrawn object, not being categorized with their actual attribute such as raw material, semi-finished or finished product, can be deducted directly from the object inventory file.

Figure 5C:
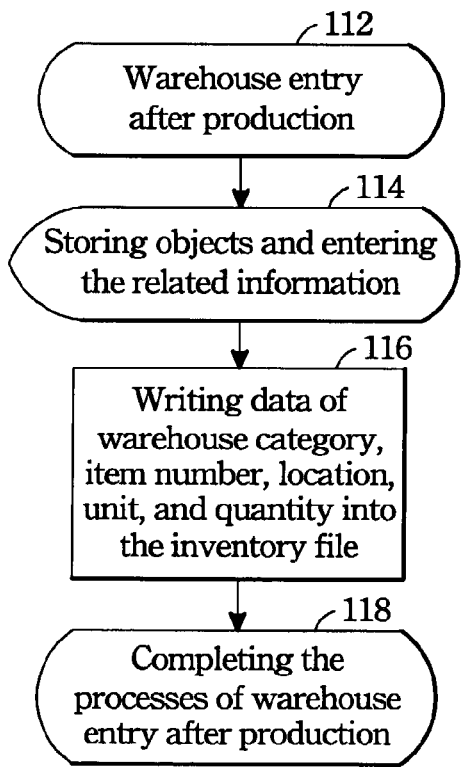
FIG. 5C illustrates the processes for production/warehouse entry in accordance with the prior art.

After completing the production plan, the processed object is returned to the warehouse again. FIG. 5C illustrates the consecutive processes starting from warehouse entry after production 112, and operating the WMS to key in the entered object information 114, wherein the objects are not separated into semi-finished or finished products to specifically go into the semi-finished or finished warehouses when writing into the inventory file 116. The basic information such as warehouse category based on the physical object location, item number, location, unit, quantity is entered directly to create the inventory file for the completion of warehouse entry after production processes 118. Again, the warehouse category is based on where the object is actually stored to directly reflect its physical location.

Generally speaking, after the completion of scheduled production/processing illustrated in FIG. 4, the object is withdrawn from the warehouse 110 for selling 130; wherein the object for sale can be with finished or semi-finished attribute depending on the company's business consideration. As the present invention does not pertain to object attribute for warehouse categorization, there is no such limitation as in the conventional WMS that only objects with finished attribute are for sale. In other words, not subject to attribute categorization, objects can be directly withdrawn from the physical warehouse 110 for sale.

Figure 5D:
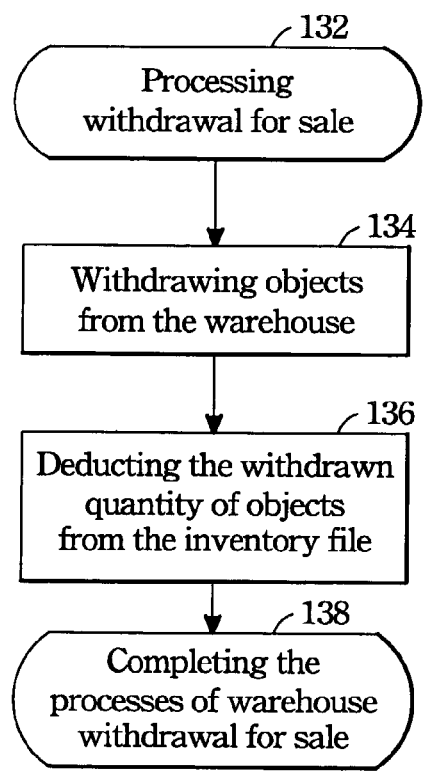
FIG. 5D illustrates the flow chart for processing object withdrawal for sale in accordance with the prior art.

The related processes, illustrated in FIG. 5D, are in the sequence of warehouse withdrawal for sale 132, selecting the inventory file for a specific object and withdrawing the order-requested quantity of the object 134, followed by the WMS deducting the withdrawn quantity from the inventory file 136 and completing the warehouse withdrawal for sale process 138. The actual attribute of the withdrawn-for-sale object could be raw material, semi-finished or finished product; nevertheless, object attribute is not used for object categorization or sale limitation in the present invention, so the withdrawn object quantity can be directly deducted from the inventory file of the database.

As FIG. 4 illustrates, some objects are considered as rejects after the procedure of production/processing and withdrawn from the warehouse 110 for reject processing 140. Once again, the objects can be withdrawn directly from the warehouse for reject processing because the categorization of warehouse is based on where the objects are actually stored rather than their attributes.

The present invention provides a set of processes to use WMS for processing object purchase, production, and selling. The processes comprise the consecutive steps of purchasing and storing the objects in the warehouse, followed by operating the WMS to create the first inventory file in the computer-readable database, wherein the first inventory file comprises warehouse category (based on where the first object is stored to reflect the physical location), item number, storage location, unit and inventory quantity for the first object. Moreover, it is not necessary to determine if the first object is raw material, semi-finished or finished product when creating the above-mentioned first inventory file. At the same time, note fields for related object information can also be added, wherein the fields at least comprise warehouse owner, warehouse area, object owner and object management attribute.

During the production, the first inventory file is read and the first object is withdrawn from the warehouse based on the production requirement plan. Next, the first inventory file is modified and recorded into the database, wherein the inventory quantity of the first object is deducted with the withdrawn amount of the first object. Next, the first object is processed to produce the second object, which is stored back in the warehouse. The next step is the WMS operation to create the second inventory file in the database, wherein the second inventory file comprises the warehouse category (based on where the second object is stored to reflect its physical location), item number, location, unit and quantity for the second object. Again, note fields for related object information can be added, wherein the fields at least comprise warehouse owner, warehouse area, object owner and object management attribute.

During the selling process, the first and second inventory files are read and the object is withdrawn directly from the warehouse based on the order-requested quantity, wherein the object can either be the first object, the second object, or any other combinations. Next is the WMS operation to modify and record the first and the second inventory files in the database, wherein the withdrawn quantity is deducted to update the inventory files of the first, and second objects. Also, there is no need to transfer/allocate warehouse category when withdrawing the order-requested quantity of the first object from the warehouse.

Note that the warehouse category in the data structure of the inventory file of the present invention is defined with the physical object location, not attributes such as finished, semi-finished product or raw material. Again, note fields for the related object information can be added in the inventory file for the convenience of the user to determine the state of the object, wherein the note fields added in the inventory file can be further separated into warehouse owner, warehouse area, object owner, object management attribute, and so on.

Thus, a certain object owned by a certain company but stored in an outsourcing factory for processing still belongs to the company's inventory assets. However, to clarify the physical location of the object, the warehouse owner listed in the related field can be further specified as the outsourcing factory owner. Again, for the convenience of the user to determine the object state, the related object attributes of approved, second-grade, defective, or consigned-for-sale product can be added in the object attribute field in the inventory file. For example, if a certain object stored in a certain company's warehouse for sale belongs to another company's inventory assets, the consigned-for-sale attribute of the object can be added in the related field for reference.

The present invention has many advantages. Firstly, the present invention does not define the warehouse category with object attribute (such as finished product, semi-finished product, or raw material). The operation of transferring/ allocating warehouse can be vastly reduced during production/selling, which simplifies the processes of from object purchase, production/processing to selling.

Secondly, the present invention categorizes the warehouses based on the actual storage location of the objects; there is no need to separate one warehouse into finished, semi-finished, or raw material categories, which causes inconvenience in warehouse management. In other words, the method introduced by the present invention can actually reflect the physical location of stored objects. Thus, the incorporation of physical warehouse categorization and note fields help to track the physical location of objects which are owned by a specific company but stored in another's warehouse. Also, the warehouse category in the inventory file reflects the physical location of the objects rather than the attributes of finished products, semi-finished products, or raw materials, which simplifies the creation of the related inventory files and occupies less space in the database.

Further, the present invention adds note fields to designate the management attributes of the same objects, which makes it easier for the user to understand the attribute/state of the object as approved, second-grade, defective, new, old, rejected, and so on. Consigned-for-sale products in the warehouse that belong to other companies' inventory assets can also be easily determined and traced with the added note field for object owners.

Moreover, the method of the present invention fully reflects how related systems influence the inventory; in turn, the state of inventory shown in the inventory file further reflects the states of the related systems, which helps to improve the WMS operation efficiency in object purchase, production, and sale processes.

It is to be understood that while a certain preferred embodiment (form) of the invention is illustrated, various changes or modifications may be made without departing from the scope of the invention and the invention is not to be considered limited to what is shown and described in the specification and drawings.

What is claimed:

1. A process to utilize a WMS to process object purchase, production, and sale, said process comprises the following steps of: purchasing a first object and storing in a warehouse, wherein said first object is classified based on the object attribute to be raw material, semi-finished product, or finished product;

operating the WMS to create a first inventory file in a computer-readable database, wherein said first inventory file comprises warehouse category, item number, location, unit and inventory quantity of said first object, and said warehouse category is defined based on said actual warehouse, where said first object is stored to reflect directly a physical location for said first object, rather than based on the object attribute of the first object;

reading said first inventory file and withdrawing said first object based on a production requirement plan from said warehouse;

modifying and recording said first inventory file into said database, wherein said inventory quantity is deducted based on a withdrawal amount of said first object;

processing said first object to produce the second object;

storing said second object into said warehouse, wherein said second object is classified based on the object attribute to be raw material, semi-finished product, or finished product;

operating said WMS to create the second inventory file in said computer-readable database, wherein said second inventory file comprises warehouse category, item number, location, unit and quantity of said second object, wherein said warehouse category is defined based on said warehouse therein said second object is physical stored to directly reflect a physical location for said second object rather than based on the object attribute of the second object;

reading said first inventory file and said second inventory files and withdrawing said object from said warehouse based on an order-requested quantity, wherein said object is chosen from a group of said first and said second object;

operating said WMS to modify said first and second inventory files and recording both into said computer-readable database, wherein said inventory quantities of said first and second objects are deducted based on withdrawal amounts of said objects;

adding first note fields to show related information of said first object when creating said first inventory file, wherein said first note fields include warehouse owner, warehouse area, object owner, and the object attribute of said first object; and adding second note fields to show related information of said second object when creating said second inventory file, wherein said second note fields include warehouse owner, warehouse area, object owner, and the object attribute of said second object.

2. The process of claim 1, wherein there is no need to determine if said first object is raw material, semi-finished, or finished product when creating said first inventory file.

3. The process of claim 1, wherein said transferring/allocating operations are not necessary when withdrawing said first object based on said order-requested quantity.

* * * * *